United States Patent
Winsor et al.

(10) Patent No.: US 8,371,278 B2
(45) Date of Patent: Feb. 12, 2013

(54) HIGH FLOW EGR SYSTEM

(75) Inventors: Richard E. Winsor, Waterloo, IA (US); Erik L. Piper, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 474 days.

(21) Appl. No.: 12/766,376

(22) Filed: Apr. 23, 2010

(65) Prior Publication Data

US 2011/0259306 A1    Oct. 27, 2011

(51) Int. Cl.
*F02M 25/07*    (2006.01)
*F02B 47/08*    (2006.01)
*F02B 33/44*    (2006.01)
*F02B 47/02*    (2006.01)

(52) U.S. Cl. ............... 123/568.12; 123/25 C; 123/25 J; 60/605.2; 60/612

(58) Field of Classification Search .............. 123/25 A, 123/25 C, 25 J, 568.11, 568.12; 60/320, 60/321, 599, 605.2, 612
See application file for complete search history.

(56) References Cited

U.S. PATENT DOCUMENTS

| | | | |
|---|---|---|---|
| 5,785,030 A | 7/1998 | Paas | |
| 6,186,126 B1* | 2/2001 | Gray, Jr. | 123/557 |
| 6,301,887 B1 | 10/2001 | Gorel et al. | |
| 6,367,256 B1 | 4/2002 | McKee | |
| 6,470,682 B2 | 10/2002 | Gray, Jr. | |
| 6,725,847 B2 | 4/2004 | Brunemann et al. | |
| 6,748,741 B2 | 6/2004 | Martin et al. | |
| 8,230,843 B2* | 7/2012 | Kurtz | 123/568.12 |
| 2003/0154716 A1* | 8/2003 | Redon | 60/605.2 |
| 2009/0000283 A1 | 1/2009 | Endicott et al. | |
| 2009/0000297 A1 | 1/2009 | Joergl et al. | |
| 2009/0071150 A1 | 3/2009 | Joergl et al. | |
| 2010/0242929 A1* | 9/2010 | Kardos et al. | 123/568.12 |

* cited by examiner

*Primary Examiner* — Willis R Wolfe, Jr.
(74) *Attorney, Agent, or Firm* — Taylor IP, P.C.

(57) ABSTRACT

A high flow EGR system for an internal combustion engine having a pair of series connected EGR coolers and a water droplet condensation collector and reservoir connected to the gas flow. The reservoir feeds a pump which is actuated to inject the liquid to the engine adjacent each cylinder for uniform distribution of the water to the engine cylinders. The pump is controlled to inject the water at appropriate conditions during the engine operating cycle.

18 Claims, 1 Drawing Sheet

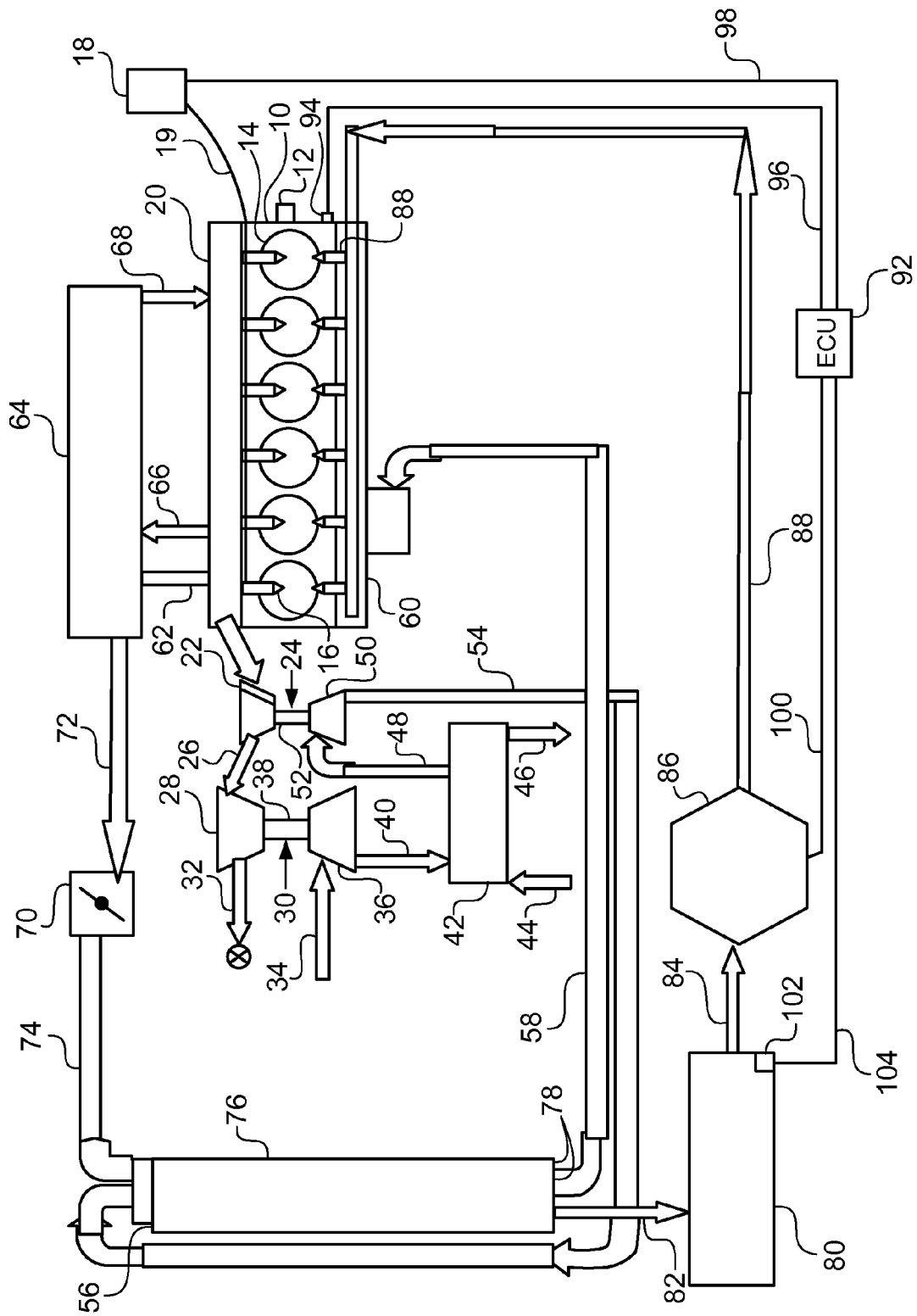

HIGH FLOW EGR SYSTEM

BACKGROUND OF THE INVENTION

1. Field of the Invention

The invention relates to exhaust gas recirculation (EGR) systems in which significant quantities of exhaust gas are recirculated to the intake of an internal combustion engine.

2. Description of the Related Art

In the continuing quest to meet lower emissions levels for internal combustion engines, the use of ever increasing quantities of EGR has been proposed. In order to reduce the combustion temperatures and, therefore, the generation of oxides of nitrogen, percentages of up to 50% and higher have been implemented. In order to minimize the effect of the large quantities of exhaust gas recirculation, it has become necessary to significantly cool the exhaust gasses to a point that greatly increases their density and minimizes the effect on power and fuel consumption when combined with the combustion air for the engine.

One of the problems with a system of this type is that the moisture in the products of combustion reaches a point where the water condenses into droplets that can accumulate or puddle at random locations within the system. Depending upon the engine operating conditions, the random collection of droplets may be swept into the intake of one or more cylinders in an uneven manner. While the engine can function with this occurrence, it can cause excess oxides of nitrogen in some cylinders and increased smoke and hydrocarbons in other cylinders.

What is needed in the art, therefore, is an EGR system that recirculates high percentages of exhaust gas but avoids the uncontrolled ingestion of water droplets into the engine.

SUMMARY OF THE INVENTION

In one form, the invention is an EGR system for introducing significant percentages of exhaust gas into the intake of an air-breathing, fuel-consuming, multi-cylinder internal combustion engine having an exhaust for products of combustion and an intake for combustion air. This system includes a passage connecting the exhaust of the internal combustion engine to its intake and a valve for controlling flow of exhaust gasses through the passage. At least one heat exchanger is positioned in the passage for significant cooling of the gasses therein, thereby promoting condensation of moisture. A collector is positioned downstream of the heat exchanger for collection of condensed water from the gas stream. A liquid pump is fluidly connected to the collector and is, in turn, connected to a plurality of injectors adjacent the air intakes for the cylinders of the engine to permit uniform flow of liquid to the cylinders of the engine.

In another form, the invention involves a power system comprising an air-breathing, fuel-consuming, multi-cylinder internal combustion engine having an exhaust for products of combustion and an intake for combustion air. A passage connects the exhaust of the IC engine to its intake and a valve is positioned in the passage for controlling flow of exhaust gas to the intake. At least one heat exchanger is positioned in the passage for cooling exhaust gasses to a significant extent and promoting condensation of moisture. A collector is positioned downstream of the heat exchanger for collecting the condensed water in the gas. A pump is fluidly connected to the collector and feeds a plurality of injectors to provide a uniform distribution of condensate to the intake of the IC engine.

BRIEF DESCRIPTION OF THE DRAWINGS

FIG. 1 is a schematic view of a power system embodying the present invention.

DETAILED DESCRIPTION OF THE INVENTION

Referring to FIG. 1, there is shown in schematic fashion an internal combustion engine 10 providing a rotary power output through crankshaft 12. Engine 10 is a fuel-consuming, air-breathing, multi-cylinder internal combustion engine having a plurality of cylinders 14 in which individual pistons reciprocate and are connected to respective connecting rods providing a rotary power output through crankshaft 12. The cylinders 14, in the present instance, receive fuel through individual fuel injectors 16 for each cylinder from a fuel system 18 via a feed line 19. The fluid interconnections between the injectors 16 and the fuel system 18 are not shown in detail to simplify the description of the present invention. The system may be a high pressure common-rail in which high pressure in maintained in line 19 or a system in which high pressure is generated at the fuel injectors 16. Other fuel system types may be employed. When internal combustion engine 10 is of the compression ignition, or diesel type, air within each cylinder is compressed sufficiently to increase its temperature so that fuel injected through fuel nozzles 16 adjacent the top of the compression stroke is ignited and provides the combustion force driving the pistons downward. Appropriate exhaust valves cause the products of combustion to be discharged into an exhaust manifold 20 and then to a turbine 22 of a high pressure turbocharger 24. From there, the exhaust gases pass by line 26 to a low pressure turbine 28 of a low pressure turbocharger 30 and, finally, to exhaust 32. The exhaust flow at this point is usually directed through exhaust aftertreatment devices such as particulate filters and catalytic converters to further reduce exhaust products emissions.

The air for combustion passes by way of intake line 34 to a compressor 36 of the low pressure turbocharger 30 and is driven by shaft 38 connected with the turbine 28. From there, the air passes from compressor 36 via line 40 to an interstage heat exchanger or cooler 42 to increase the density of the charge. As illustrated, the cooler 42 utilizes engine coolant through lines 44 and 46. It should be apparent, however, that other types of coolers may also be employed. The air that has been cooled by cooler 42 passes through line 48 to a high pressure compressor 50, which is driven by high pressure turbine 22 through shaft 52. The air thus pressurized, and partially cooled, passes through line 54 to a charge air cooler 56. Charge air cooler 56 is typically an air-to-air cooler which utilizes ambient air as the heat sink to provide a significant reduction in temperature and appropriate increase in charge density. From the charge air cooler 56, a line 58 extends to an intake manifold 60 for internal combustion engine 10. The air thus passed to the intake manifold 60, is available for delivery to the engine cylinders 14 using valves (not shown to simplify the understanding of the invention) and to be compressed and combined with fuel to ignite and provide the power output.

The engine 10 incorporates exhaust gas recirculation (EGR) by means of a passage 62 connected to the exhaust manifold 20. It should be apparent to those skilled in the art that the conduit 62 may be connected at any point in the exhaust flow as appropriate for extracting the desired percentage of exhaust gas. The exhaust gas directed through conduit 62 passes through a high temperature EGR cooler 64, which utilizes engine coolant through lines 66 and 68 to take heat out of the exhaust gasses passing therethrough. The exhaust gasses then are connected to a valve 70 by line 72. Valve 70 is controlled to alter the flow passage for exhaust gas in order to control the flow of exhaust gas into a line 74 to a low temperature EGR cooler 76 in which the EGR is introduced into the intake air conduit 58 and mixed with the fresh air adjacent the outlet side 78 of both the charge air cooler 56 and low temperature EGR cooler 76. As illustrated, the charge air cooler 56 and low temperature EGR cooler 76 are incorporated into a single housing. It should be apparent, however, to those skilled in the art that the two components may be employed as separate units so long as the fresh air and recirculated exhaust gas combine downstream of the coolers.

Because the gasses passing through the cooler are cooled to such an extent, moisture in the gas condenses out as droplets and, for this purpose, a condensation reservoir 80 is employed and connected to the gas flow path by conduit 82, which reaches a low or drain point within the combined coolers 56 and 76. Although FIG. 1 is shown as schematic, it should be apparent to those skilled in the art that the physical geometry of the elements may be altered so as to provide a low point adjacent the line 82 receiving the combined flow and collecting the moisture droplets that have been condensed. The condensation reservoir 80 is connected by a line 84 to the inlet of a pump 86 that, in turn, connects to a line 88 leading to a plurality of water injectors 88 that inject water into the intake manifold 60 adjacent the individual cylinders 14. Pump 86 may be mechanically or electrically driven as appropriate for the overall system.

The engine 10 employs electronic control in the form of an electronic control unit (ECU) 92 that receives inputs from sensors 94 via line 96 to provide control of fuel system 18 via line 98. It should be apparent to those skilled in the art that a multiplicity of sensors 94 may be provided to generate signals reflecting appropriate engine parameters which are fed to the ECU 92 and, thus, provide signal inputs to fuel system 18 to control the quantity of fuel and timing of injection for the particular engine operating condition so as to provide adequate power while minimizing fuel consumption and emissions.

ECU 92 also provides control inputs to EGR valve 70 via a line, which has been omitted to simplify the drawing, to coordinate the EGR flow with the desired conditions of the engine. ECU 92 also may provide a signal to control pump 86 via line 100 to withdraw liquid from reservoir 80 and pressurize it for delivery to the water injectors adjacent the cylinders for uniform consumption by the engine. ECU 92 also provides an input to pump 86 that prevents injection of water during light load operating conditions below approximately 20% of maximum power. In addition, injection may be controlled when engine 10 experiences rapid increases in required power output to act in lieu of EGR to minimize emissions during this operating condition.

In order to ensure that the appropriate levels of liquid in the condensation reservoir 80 are maintained, a level sensor 102 senses the level and provides a signal input to ECU 92 via line 104 to ensure that the reservoir 80 does not overflow or water injection is overused. The pump 86 is controlled to inject a desired water flow rate which can be a function of engine rpm, load, and ambient temperature and other operating parameters of engine 10.

The system described above utilizes a controlled collection of moisture droplets in the engine intake air to collect and controllably inject in a uniform manner to multiple cylinders of the engine. Such a system uniformly distributes the moisture in a way that has a minimum impact on the engine and which avoids issues of uncontrolled ingestion of liquid or the need for discharging directly overboard liquid that may have contaminants within it.

Having described the preferred embodiment, it will become apparent that various modifications can be made without departing from the scope of the invention as defined in the accompanying claims.

The invention claimed is:

1. An exhaust gas recirculation (EGR) system for introducing significant quantities of exhaust gas into the intake of an air-breathing, fuel-consuming, multi-cylinder internal combustion (IC) engine having an exhaust for products of combustion and an intake for combustion air, said system comprising:
   a passage connecting the exhaust of said IC engine to its intake;
   a valve for controlling flow of exhaust through said passage;
   at least one EGR heat exchanger interposed in said passage for cooling to a significant extent the gas passing therethrough thus resulting in condensation;
   a collector downstream of said heat exchanger for collecting the condensation from the gas stream;
   a pump connected to said collector; and
   a plurality of injectors connected to the output of said pump for uniform distribution of flow to the air intakes for said cylinders of said IC engine.

2. The EGR system of claim 1 having an injector for each cylinder of said multi-cylinder engine.

3. The EGR system of claim 1 including a pair of EGR coolers.

4. The EGR system of claim 1 further including an intake air cooler upstream of the point at which said passage connects the exhaust of the IC engine to its intake.

5. The EGR system of claim 4 wherein the intake cooler is an air-to-air intercooler.

6. The EGR system of claim 1 further including a control for said pump.

7. The EGR system of claim 6 wherein said pump is controlled to controllably inject when the engine power output is rapidly increased.

8. The EGR system of claim 6 wherein said pump is controlled to inject when the engine power output are above a light load.

9. The EGR system of claim 8 further including a reservoir and a level sensor in said reservoir for sensing the quantity of liquid in said reservoir.

10. A power system comprising:
    a air-breathing, fuel-consuming, multi-cylinder internal combustion (IC) engine having an exhaust for products of combustion and an intake for combustion air;
    a passage connecting the exhaust of said IC engine to its intake;
    a valve for controlling flow of exhaust gasses through said passage;
    at least one EGR heat exchanger in said passage for significant cooling of the gasses flowing therethrough for promoting condensation of moisture droplets;
    a collector downstream of said heat exchanger for collecting the condensation;
    a pump connected to said collector; and
    a plurality of injectors connected to said pump for uniform distribution of liquid to said cylinders.

11. The power system of claim 10 having a water injector for each cylinder.

12. The power system of claim 10 further including a pair of EGR coolers.

13. The power system of claim 10 further including an intake air cooler upstream of said passage connecting the exhaust of the IC engine to its intake.

14. The power system of claim 13 wherein said intake air cooler is an air-to-air after cooler.

15. The power system of claim 10 further comprising a control for said pump.

16. The power system of claim 15 wherein said pump is controlled to inject when the engine power output is above a light load.

17. The power system of claim 16 further comprising a reservoir for condensed liquid and a level sensor.

18. The power system of claim 16 wherein said pump is controlled to inject when the engine power output is above a load approximately 20% of the maximum engine power.

\* \* \* \* \*